United States Patent [19]

Gendron

[11] 4,286,940

[45] Sep. 1, 1981

[54] METHOD AND APPARATUS FOR INJECTION BLOW MOLDING AN ARTICLE WITH IMPROVED DETAIL DEFINITION

[75] Inventor: Aime J. Gendron, Rehoboth, Mass.

[73] Assignee: Hercules Incorporated, Wilmington, Del.

[21] Appl. No.: 40,891

[22] Filed: May 21, 1979

[51] Int. Cl.³ ............................................. B29C 17/07
[52] U.S. Cl. ............................................................. 425/533
[58] Field of Search .................... 425/522, 525, 533; 264/509, 523, 537, 538

[56] References Cited

U.S. PATENT DOCUMENTS

| 3,191,225 | 6/1965 | Polka | 425/533 X |
| 4,170,623 | 10/1979 | Dubois et al. | 264/534 |

FOREIGN PATENT DOCUMENTS

| 2817572 | 11/1978 | Fed. Rep. of Germany | 264/509 |
| 49-25182 | 6/1974 | Japan | 264/537 |
| 1166893 | 10/1969 | United Kingdom | 425/522 |

Primary Examiner—Jan H. Silbaugh
Attorney, Agent, or Firm—McCormick, Paulding & Huber

[57] ABSTRACT

An injection blow molding apparatus and method produces articles by injecting a settable material at high pressure into the cavity of an injection mold to form a parison and then expanding the parison in a blow mold defining the configuration of the article. The injection mold defines intricate detail in the walls of the injection cavity and produces a parison with the detail formed thereon. Detail on the expanded portion of the parison is preserved in the blow mold and appears on the surface of the blown article without loss of definition.

10 Claims, 7 Drawing Figures

METHOD AND APPARATUS FOR INJECTION BLOW MOLDING AN ARTICLE WITH IMPROVED DETAIL DEFINITION

BACKGROUND OF THE INVENTION

The present invention relates to injection blow molding methods and apparatus in which a settable material is first injected into a mold cavity to form a parison and then the parison is subsequently expanded in a blowing operation to form an article such as a container. More particularly, the present invention is concerned with an injection blow molding method and apparatus that permits intricate detail of fine definition or resolution to be produced on the blown article.

Injection blow molding machines, such as disclosed in U.S. Pat. No. 4,076,484 having the same assignee as the present invention, are well known in the art for forming hollow articles, particularly containers of various sizes and shapes. Thermoplastic materials such as polypropylene or polyethylene are heated to a molten, semi-fluid state and are injected into the cavity of an injection mold to form a parison over a removable core or parison pin. Before the material has had an opportunity to completely set, the parison pin together with the parison thereon is removed from the injection mold and transferred to a blow mold where pressurized gas or air is blown through the pin to the interior of the parison and causes the parison to expand outwardly in the larger cavity of the blow mold. The expanded parison takes the shape of the blow mold cavity corresponding to a desired shape of the article, and is allowed to set sufficiently to retain that shape thereafter.

It is difficult to form articles in an injection blow molding process with intricate detail of high resolution such as narrow scuffrings, readable characters, designs and other functional and nonfunctional features. Due to the low temperatures that prevail in the blowing operation, the thermoplastic material assumes a more crystalline than amorphous character. With blown materials, fluidity and consequently the ability to form the materials with features of high definition are lost as temperatures drop during transfer from the injection mold to the blow mold. Additionally, the temperatures of the blow molds are controlled to cool the materials on contact and thereby accelerate the setting of the materials when the expanded parison assumes the shape of the mold cavity. Consequently, when contact occurs between the walls of the blow cavity and the outer surface of the expanded parison, the molding of detail on the exterior surfaces is not possible.

A further problem which aggravates the molding of detail features on a blown article is the fact that blow pressures are relatively low compared to pressures encountered in injection molding machines or in the injection side of an injection blow molding machine. Pressures in the order of 100–150 psi are typical for blow gases and air, and such pressures cannot be relied upon to press or extrude plastic material into corners or recesses of small dimension to provide a molded feature with sharp detail. In general, where the detailed feature has dimensions that are less than twice the wall thickness of the parison, molding with high resolution is not possible.

One prior art method of developing detail on the exterior of a blown article comprises an embossing process. An engraving bearing the desired detail is positioned in the bottom of a blow cavity, and the thermoplastic material is mechanically pressed against the engraving by means of the parison pin when the parison is inserted into blow mold. The parison pin may have an extendable tip for this purpose or the pin may have a length equal to the depth of the blow cavity to press the parison against the engraving upon insertion.

Quite obviously, the formation of detail by the above embossing process is limited to those situations in which the engraving is located directly below the parison pin at an area of the parison which does not expand during the blowing process. There are, however, many other situations in which intricate detail or molding features of high resolution are desired on the exterior of the finished article.

It is, accordingly, a general object of the present invention to provide method and apparatus for forming intricate detail on the article that is formed in an injection blow molding machine.

SUMMARY OF THE INVENTION

The present invention resides in a method and apparatus for forming molded articles with intricate detail thereon. The apparatus which carries out the method includes an injection blow molding machine having an injection mold in which a parison is formed by injecting a settable material such as a thermoplastic into the mold cavity at a relatively high pressure. An associated blow mold is also included in the machine and a parison formed in the injection mold is transferred to the cavity of the blow mold for expansion into the shape of a desired article. The blow pressure utilized to expand the parison is generally substantially less than the relatively high pressure used to inject the material into the cavity of the injection mold.

Means are provided in the injection mold cavity for forming detailed features on a portion of the parison to be expanded in the blow cavity. These features may include thin, shallow or contoured projections and recesses having sharp definition such as scuffrings, readable characters, designs or other features of a scale substantially smaller than the general contours of the parison formed in the injection cavity.

The blow mold which receives the parison with the detail features thereon is constructed in such a manner that the details are preserved during the blowing operation. For example, the blow cavity may include a smooth flat surface against which the detail features are pressed; however, the blow pressures, being substantially less than the injection pressures, do not exert sufficient forces on the detailed features to cause distortion or deformation. Furthermore, the mold may be provided with recesses which accommodate detail on the parison in relief without contacting such detail.

Consequently, the article produced in the injection blow molding machine bears the detailed features that are formed in the injection mold where conditions of temperature, pressure and other factors are more favorable than in the blow mold. Such features are formed on an expandable portion of the parison and are preserved during the blowing operation without loss of definition.

DESCRIPTION OF THE PREFERRED EMBODIMENTS

Figure 1:
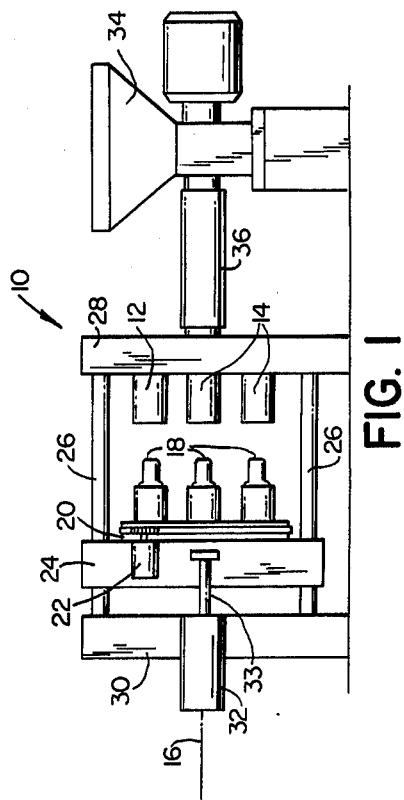
FIG. 1 is a schematic illustration of an injection blow molding machine in which the present invention may be employed.

FIG. 1 illustrates an injection blow molding machine of the type in which the present invention may be practiced and employed. The machine, generally designated 10, includes a plurality of injection molds 12 and blow molds 14 distributed in a circular array about the horizontal machine axis 16. A corresponding plurality of parison pins 18 are also distributed in a circular array about the axis 16 for insertion and withdrawal from the molds. The parison pins are mounted on an indexing plate 20 that is rotated about the machine axis by means of a drive motor 22. In addition, both the plate 20 and drive motor 22 are mounted on a reciprocated platen 24 that slides on tie rods 26 between a stationary front platen 28 and a stationary rear platen 30. Movement of the platen 24 on the tie rods is controlled by means of hydraulically or pneumatically operated actuators 32 (one visible) mounted on the rear platen at each side and having actuating rods 33 extending to the platen 24.

During an injection blow molding operation in the machine 10, a settable thermoplastic material such as polypropylene, polyethylene, polystyrene, ABS or a polycarbonate material is deposited in pellet or powder form in the hopper 34. The plastic material is heated to a semi-fluid state within an injection screw or ram 36 in preparation for the injection process. Prior to injection, the movable platen 24 inserts the core or parison pins 18 into the cavities of the respective molds to close the cavities, and thereafter the ram 36 injects a charge of the heated plastic into the injection cavities through a nozzle and passageways within the stationary platen 28. The pressures developed by the ram during the injection process are relatively high and are typically within the range of 6,000–12,000 psi.

Within the injection cavities, the plastic material cools and partially sets to form a parison in the first stage of molding of a hollow article. The platen 24 is then retracted toward the rear platen 30, and the formed parisons are withdrawn from the injection molds 12 on the parison pins 18. The drive motor 22 indexes the plate 20 to bring the parisons and their respective pins into axial alignment with the cavities of the blow molds 14 for a blowing operation.

It should be understood in FIG. 1 that there are two injection molds (only one visible), two blow molds diametrically opposite the injection molds and four cooperative parison pins as shown in greater detail in the above-referenced U.S. Pat. No. 4,076,484. Two parisons are formed during each injection step and those two parisons are then withdrawn from the injection molds on two of the parison pins. When the parisons are rotated into alignment with the cavities of the blow molds 14, the movable platen 24 inserts the parisons and their respective pins into the blow cavities, and the parisons are then blown to their final configuration determined by the contours of the blow cavities. Upon subsequent retraction of the platen 24 the two blown articles are ejected from the machine and fall into a tray or chute for collection or distribution to other points outside of the machine. With two injection molds, two blow molds and four parison pins two parisons are formed in the injection molds 12 while another two parisons are blown or expanded in the blow molds 14. Thus, each time the molds are opened two finished articles are ejected.

Figure 2:
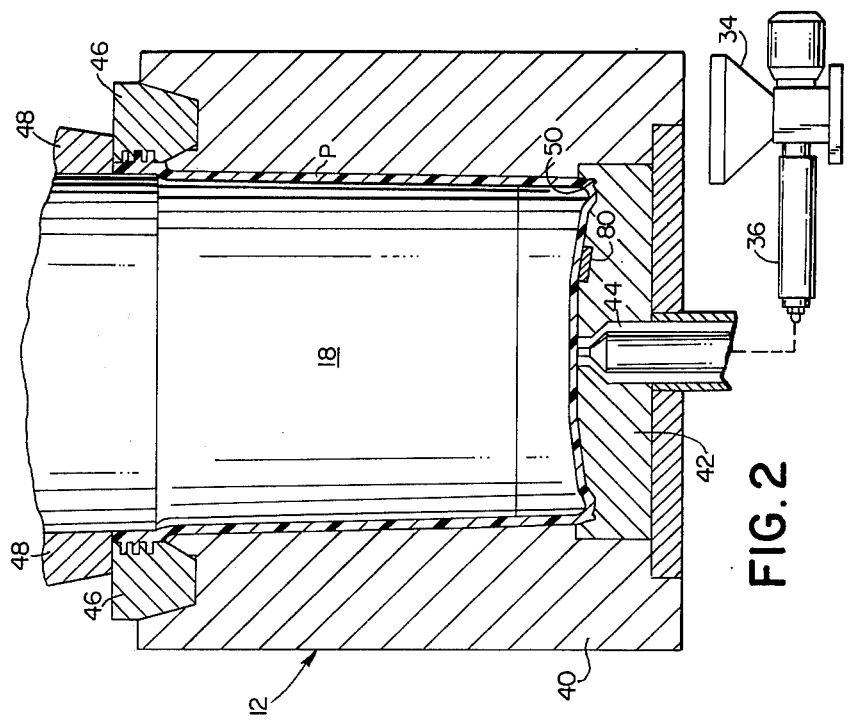
FIG. 2 is a cross-sectional view of an injection mold in the machine of FIG. 1 and includes detail molding features in accordance with the present invention.

FIG. 2 illustrates the injection mold 12 in greater detail. The injection mold 12 includes cylindrical sides 40 and a bottom plate 42 which together define an injection cavity in which the parison pin 18 is positioned coaxially of the central mold axis during the injection process. As shown, a settable thermoplastic material has been injected into the mold cavity from the ram 36 through the injection porting 44 in the plate 42. A heater may be disposed within the porting 44 if necessary to maintain the plastic material in a molten and semi-fluid state as the material is injected into the cavity and flows over the parison pin 18. The cylindrical sides 40 may be heated or cooled to establish the proper temperature at the cavity walls for partially setting the material after it has been injected and fills the space between the pin and mold to form the parison P.

The upper portion of the parison P is formed between the pin 18 and a pair of split neck ring segments 46 which completely surround the pin when the pin is inserted in the injection cavity and the segments are seated within the annular recess at the top of the mold sides 40. The inner, notched surfaces of the neck ring segments 46 define the exterior contours on the neck portion of the parison which, by way of example, eventually forms a hollow, wide-mouth container. It will be observed in FIG. 2 that the side walls of the injection cavity and the corresponding portions of the parison pin 18 tapper inwardly toward the bottom of the mold cavity to allow the neck ring segments 46 and the pin 18 to be withdrawn from the injection mold 12 with the parison P captured on the pin. The finish at the top of the parison is formed by a stripper ring 48 which also surrounds the parison and reciprocates along the pin 18 to remove the finished article at the end of the molding operation. For a more complete description of the mold, the neck ring segments, the stripper ring and their operation, reference may be had to the above-referenced U.S. Pat. No. 4,076,484.

In accordance with the present invention the injection mold 12 is designed to permit molding features of intricate detail to be formed on the blown article with high resolution or definition. For example, an annular recess 50 in the bottom plate circumscribes the mold axis at the outer periphery of the plate and defines a thin scuffring on which the finished article will eventually rest in its upright position. The scuffring and correspondingly the recess 50 have relatively small dimensions, such as a width and depth no greater than 0.1 inch, and are set apart from the general contour of the parison by sharp angles or breaks in the outer surface of the parison.

Detailed features of high resolution, such as the scuffring initially formed by the recess 50, are included in the walls of the injection cavity and are formed on the parison because such features cannot be subsequently generated in the plastic material in the blowing operation. Conditions such as the temperature and the relatively low blow pressure are not conducive to the formation of intricate detail on the expanded portion of the parison. Fine features having small dimensions cannot be developed bacause the material in the blow stage of the molding operation has started to set and changes from an amorphorus to a more crystalline condition. Sufficient plasticity remains in the material to permit expansion of the parison into a shape defined by the general contours of the blow cavity; however, details such as the scuffring having dimensions which are no greater than twice the thickness of the parison wall cannot be blown into corresponding recesses of the blow mold with sharp definition or resolution.

On the other hand, the thermoplastic material is injected into the cavity of the injection mold 12 at elevated temperatures and pressures which allow the formation of intricate detail with little or no difficulty. At the elevated temperatures, the material is highly fluid and at pressures in the order of 6,000–12,000 psi significant detail can be developed on the expandable portion of a parison as well as in the nonexpanded portion within the neck ring segments 46.

Accordingly, the plastic material flows from the nozzle 44 into the injection cavity and over the parison pin 18 to fill all of the recess in the neck ring segments 46 as well as the annular recess 50 in the bottom plate 42. The high injection pressure packs the material firmly in the recesses and insures that the annular projections developed on the parison are completely formed with all intricate detail including any angular demarcations between the projections and the adjacent parison walls.

Figure 3:
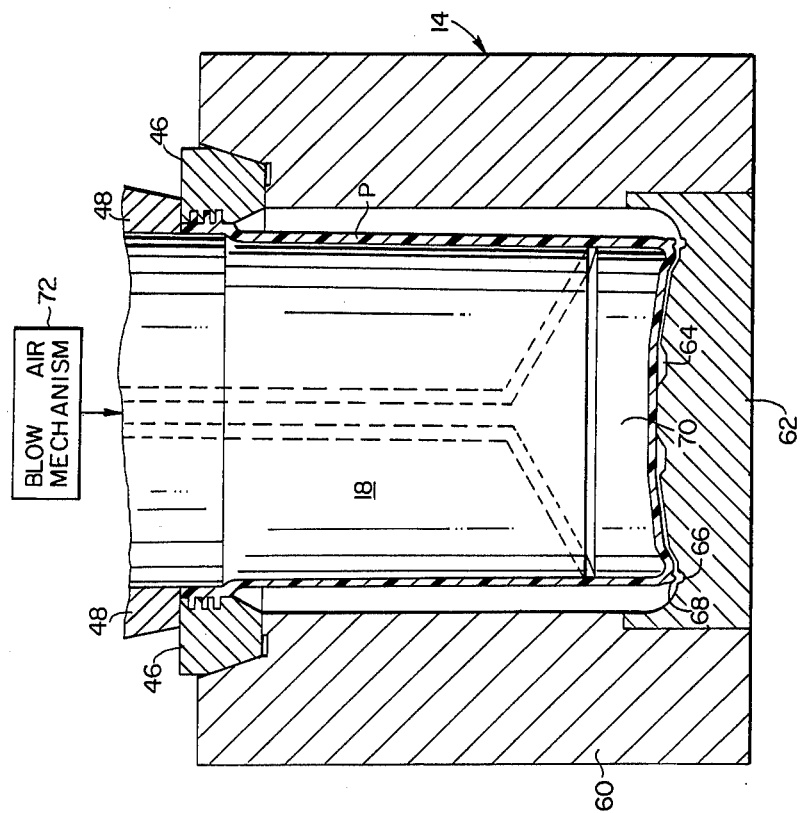
FIG. 3 is a cross-sectional view of a blow mold in the molding machine of FIG. 1 and illustrates a parison inserted in the mold cavity prior to blowing.

Once the parison P has been formed with the intricate detail thereon, the parison is withdrawn from the cavity of the injection mold and transferred by means of the neck ring segments 46 and parison pin 18 to the cavity of the blow mold 14 as shown in FIG. 3. The cavity of the blow mold is defined by cylindrical sides 60 and a bottom plate 62. The sides and the bottom plate may be heated or cooled to control the temperature of the cavity walls. As shown, the parison is inserted coaxially of the central mold axis in the blow cavity with the expandable portion of the parison in spaced relationship from the side walls. The lower end or tip 70 of the parison pin 18 is extended slightly from the rest of the pin and clamps the central portion of the parison bottom against the bottom plate 62. The clamping or pinning of the parison to the bottom plate insures that the parison will subsequently expand uniformly relative to the coaxial axes of the pin 18 and mold 14.

It will be observed that the bottom plate 62 includes a relatively large, central annular recess 64 which develops a supporting ring around the clamped portion of the parison during blowing. A smaller annular recess 66 corresponding to the recess 50 in the injection mold is provided near the periphery of the plate 62. The annular projection 68 developed with high resolution on the expandable portion of the parison by the recess 50 in the injection mold confronts the recess 66 when the parison is positioned in the blow mold. In accordance with the present invention, the recess 66 preserves the annular projection 68 during the step of blowing as described below.

When the tip 70 of the parison pin 18 is extended, fluid channels are also opened through the pin and allow compressed air at a pressure of, for example, 150 psi to be delivered from the blow air mechanism 72 to the interior of the parison through the annular opening formed between the extended tip 70 and the remaining portion of the pin 18. The side walls of the parison expand radially outward against side 60 of the blow mold, and the bottom portion of the parison spreads downwardly.

Figure 5:
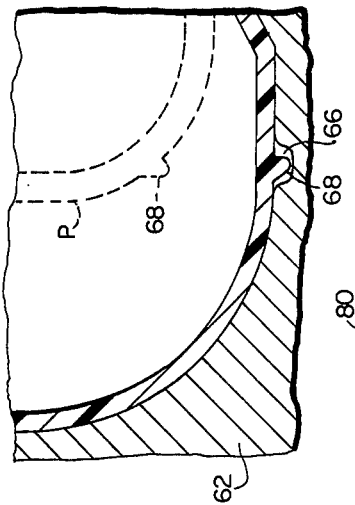
FIG. 5 is a fragmentary view of the blow mold in FIG. 4 and illustrates the movement of the parison from its unblown to its blown position in the lower portion of the mold cavity.
Figure 4:
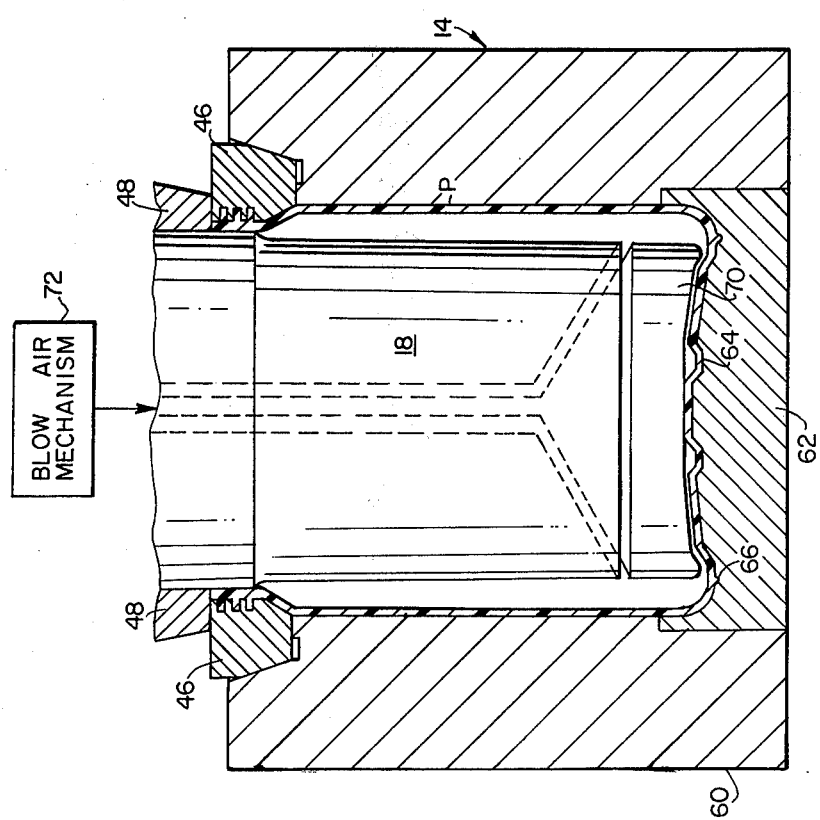
FIG. 4 is another cross-sectional view of the blow mold in FIG. 3 and illustrates the parison after it has been blown to the shape of the mold cavity in accordance with the present invention.

FIG. 4 illustrates the parison P after it has been blown into the shape of a hollow article as defined by the contours of the cavity in the blow mold 14. The side walls of the parison contact the sides 60 and the bottom assumes the general contour of the bottom plate 62 including the annular recess 64. However, as shown in the enlarged fragmentary view of the bottom plate 62 in FIG. 5, the annular projection 68 (not distinguishable in FIG. 4) forming the scuffring on the article has moved downwardly into the annular recess 66 which is dimensioned with a greater width and depth than the recess 50 to accommodate the projection 68 without permitting the projection or the adjacent wall portions of the expanded parison to deform.

It will be understood that before insertion in the blow mold 14, the thermoplastic material forming the parison was cooled and partially set up. Such cooling was caused in part by the sides 40 of the injection mold as well as the exposure of the parison to ambient air between withdrawal from the injection mold and insertion into the blow mold. Additionally, the temperature of the sides 60 and bottom plate 62 of the blow mold may be controlled by suitable cooling or heating conduits so that further setting of the expandable portion of the parison occurs as soon as the cavity walls are contacted. This partial setting of the thermoplastic material strengthens the expanded wall of the parison and prevents deformation of the wall into the relatively narrow recess 66. As a result, the projection 68 is preserved with complete and accurate definition including the sharp angles of demarcation at the parison wall and the full, rounded tip in the lower portion of the recess 66.

Had the projection 68 not been formed in the injection mold and instead had the base plate 62 in the blow mold been provided with a forming recess to shape the projection 68 from material in the wall of the parison P, the projection detail would not have been developed due to the lower pressures and temperatures that exist in the blowing operation. As shown, the projection is of substantially the same dimensions as the wall thickness, and the extrusion or deformation of the wall into a small forming recess such as the recess 50 in FIG. 2 would not have developed the full, rounded tip of the projection nor could a uniform configuration of the projection be insured around the entire annulus of the scuffring. The finished article, therefore, would rest upon an uneven ring possibly in an unstable condition. The formation of the projection under the higher temperatures and pressures of the injection mold insures complete development of the projection with all of its intricate detail and a correspondingly developed scuffring on the finished surface of the expanded parison.

The present invention is not limited to the formation of intricate detail in relief on the surface of an article. The invention can also be employed to produce detail depressed below the surface of the parison or combinations of detail projecting and depressed.

Figure 6:
FIG. 6 is an elevation view of an engraved insert positioned in the injection mold in FIG. 2.
Figure 7:
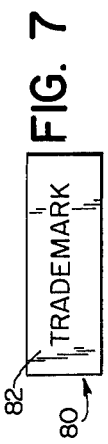
FIG. 7 is a plan view of the engraved insert in FIG. 6.

For example, an engraved insert 80 as shown in FIGS. 6 and 7 bearing a trademark, patent number and other information or design may be installed in the base plate 42 of the injection mold 12 as shown in the cross-sectional view of FIG. 2. The insert 80 is a laminated structure consisting of an engraving 82 bonded or otherwise attached to a substrate 84 for mounting in the base plate of the mold. The engraving has, for example, letters or other readable characters in relief. Each letter may be raised by 0.005 inches above the background surface of the engraving and typically might have height and widths in the order of 0.070 inch by 0.030 inch respectively. Each stroke of the letters is less than 0.001 inch in thickness.

When the substrate 84 with the engraving 82 is mounted in the base plate 62 and a charge of thermoplastic material is injected into the mold cavity, the trademark formed by the characters is molded in the bottom side of the parison P. Upon transfer of the parison to the blow mold 14, the mark is located outside of the annular recess 64 in non-contacting, confronting relationship with the bottom surface of the mold cavity defined by the base plate 62. During the blowing operation the bottom of the parison is pressed downwardly into contact with a smooth, flat surface of the base plate but without consequential effect upon the molded trademark. The pressures of the blowing operation do not disturb the fine detail of the letters or the partially set material of the parison at this stage of the molding operation. Furthermore, it has been found that even when the mark is formed on the parison in relief, the typical blowing pressures are not sufficient to cause damage to the characters raised by 0.005 inch even though an accommodating recess is not provided in the plate 62. Other forms of intricate detail including designs that have features both recessed and in relief may be formed in the parison and be retained during the blowing operation without loss of definition.

It will be recognized that the placing of detail of high definition on an expandable portion of the parison may lead to a slight distortion or increase in the scale of the detail when the parison is expanded to its final size. Nevertheless, the sharp, clear definition of the detail developed in the injection mold and which cannot be developed under blow conditions is preserved. For this reason, the formation and preservation of such detail is not limited to those portions of the parison near the center line of the mold which experience little or no expansion but may also be developed in the side walls of the parison that expand against the side 60 of the blow mold 14.

In summary, intricate detail is formed on an article that is produced in an injection blow molding machine by developing such detail on the parison in the injection mold and thereafter preserving such detail while the parison is blown to an expanded shape in the blow mold. Such detail cannot be formed on the expanded portion of the parison under typical conditions that exist during a blowing operation.

While the present invention has been described in a preferred embodiment, it should be understood that numerous modifications and substitutions can be had without departing from the spirit of the invention. For example, the detail of high resolution described above pertains to scuffring development at the bottom side of a blown container or a word mark molded in the surface of the container. However, other functional elements, informational detail or fanciful designs can be produced by the same method on the exterior in recessed, relief and combinations of both recessed and relief form. The detailed features may be engraved or inset in the walls of the injection mold cavity. Preservation of the detail in the blow mold may be had by providing a recess that confronts the detail during blowing. Accordingly, the present invention has been described in a preferred embodiment by way of illustration rather than limitation.

I claim:

1. Apparatus for forming molded articles with improved raised detail definition comprising:
   a parison pin;
   a blow mold having an interior mold wall defining a cavity for blowing a parison on the parison pin and also defining the general exterior shape of an article formed by expanding the parison in the cavity at a blowing pressure;
   fluid pressure generating means cooperating with the parison pin and the blow mold for expanding the parison outwardly away from the pin and against the wall in the blow mold at the blowing pressure;
   an injection mold associated with the parison pin and blow mold, and having an interior mold wall defining a mold cavity in which the pin is inserted and in which a settable material is injected between the pin and the mold wall to form a parison for subsequent transfer to and expansion in the blow mold, the injection mold wall including at least one region defining an expandable part of the parison expanded in the blow mold and said region of the mold wall bearing recess defining means defining raised molding detail of definition and dimension finer than that formable in the blow mold under blowing pressure and conditions;
   the interior wall of the blow mold also including recess defining means in a region disposed in confronting relationship with the raised molding detail of the parison during blowing, the recess defining means defining a recess located and dimensioned to receive and preserve the raised molding detail when the parison is expanded in the mold at the blowing pressure; and
   injection means connected with the injection mold for injecting settable material into the mold at a pressure greater than the blowing pressure and sufficient to form the parison with the raised molding detail thereon.

2. Apparatus for forming molded articles as defined in claim 1 wherein:
   the recess defining means in said region of the injection mold wall defines an annular recess of given depth circumscribing the bottom of the mold cavity and producing an annular projection on the bottom of the formed parison; and
   the recess defining means in the wall of the blow mold cavity defines a corresponding annular recess in the bottom of the cavity and having a depth greater than the given depth of the recess in the injection mold to receive the annular projection.

3. Apparatus for forming molded articles as defined in claim 1 wherein the recess defining means in the injection mold has a width and depth not greater than 0.1 inch.

4. Apparatus for forming molded articles as defined in claim 1 wherein the recess defining means is joined with the general contours of the injection mold cavity defining wall by angles in the wall.

5. Apparatus for forming molded articles as defined in claim 1 wherein the injection means generates an injection pressure not less than 6000 psi.

6. In an injection blow molding apparatus having an injection mold in which a parison is formed by injecting a settable material at relatively high pressure into an injection mold cavity and a blow mold cavity defining a surface against which the transferred parison is expanded at a blowing pressure substantially less than the relatively high injection pressure, the improvement comprising:
 means within the injection mold and defining a portion of the injection mold cavity for forming on an exterior portion of the parison, said portion to be expanded in the blow mold cavity, raised detail features which are raised not substantially more than 0.1 inch above the surface of the parison and are incapable of definition in the blow cavity under blowing conditions; and
 recess means within the blow mold forming a portion of the blow mold cavity and defining a surface disposed during blowing adjacent said raised detail features formed on the parison in the injection cavity for cooperating with the parison to receive and preserve the raised detail features under blowing conditions.

7. In an injection blow molding apparatus, the improvement as defined in claim 6 wherein:
 the means for forming raised detail features in the injection mold comprises recess means forming an annular ring on the parison, the ring being raised a finite amount above the surrounding parison surface and located coaxially of the parison on the bottom.

8. The improvement of claim 7 wherein the recess defining means in the blow mold comprises an annular recessed portion of the surface defining the blow cavity, the recessed portion having a depth greater than 0.1 inch.

9. In an injection blow molding apparatus, the improvement of claim 6 wherein the means in the injection mold for forming includes an annular recess in the wall of the mold cavity having a recess depth less than 0.1 inch and a width less than 0.1 inch.

10. In an injection blow molding apparatus, the improvement of claim 6 wherein the means in the injection mold for forming includes means defining readable characters on the surface of the parison.

* * * * *